(12) United States Patent
Hong

(10) Patent No.: US 9,099,723 B2
(45) Date of Patent: Aug. 4, 2015

(54) BATTERY PACK AND MANUFACTURING METHOD THEREOF

(75) Inventor: Won-Ki Hong, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 694 days.

(21) Appl. No.: 13/240,898

(22) Filed: Sep. 22, 2011

(65) Prior Publication Data

US 2012/0156525 A1 Jun. 21, 2012

(30) Foreign Application Priority Data

Dec. 21, 2010 (KR) .................. 10-2010-0131756

(51) Int. Cl.
*H01M 2/20* (2006.01)
*H01M 10/42* (2006.01)
*H01M 2/10* (2006.01)

(52) U.S. Cl.
CPC .............. *H01M 2/204* (2013.01); *H01M 2/105* (2013.01); *H01M 10/425* (2013.01); *H01M 2/1016* (2013.01); *H01M 2200/00* (2013.01); *H01M 2200/10* (2013.01); *Y10T 29/49117* (2015.01)

(58) Field of Classification Search
CPC .......... H01M 2/1016; H01M 2200/00; H01M 2200/10; H01M 10/425
See application file for complete search history.

(56) References Cited

U.S. PATENT DOCUMENTS

| | | | |
|---|---|---|---|
| 1,327,336 A * | 1/1920 | Leitner et al. ................... | 29/2 |
| 5,856,773 A * | 1/1999 | Chandler et al. ............. | 338/22 R |
| 5,918,909 A * | 7/1999 | Fiala et al. ..................... | 283/61 |
| 2005/0153583 A1* | 7/2005 | Kawamura et al. .......... | 439/76.2 |
| 2009/0104513 A1 | 4/2009 | Um | |
| 2009/0155631 A1* | 6/2009 | Baek et al. ..................... | 429/7 |
| 2009/0265906 A1* | 10/2009 | Kim .............................. | 29/243.54 |
| 2009/0297891 A1* | 12/2009 | Byun et al. ..................... | 429/7 |
| 2009/0316337 A1 | 12/2009 | Manago et al. | |
| 2009/0317707 A1 | 12/2009 | Cha | |
| 2010/0018027 A1* | 1/2010 | Stevenson et al. ......... | 29/525.06 |

FOREIGN PATENT DOCUMENTS

| | | |
|---|---|---|
| JP | 2010-003731 A | 1/2010 |
| KR | 10-2007-0108758 | 11/2007 |
| KR | 0871917 B1 | 11/2008 |
| KR | 2009-0022892 A | 3/2009 |
| KR | 10-2009-0063846 | 6/2009 |
| KR | 2009-0132494 A | 12/2009 |

OTHER PUBLICATIONS

Yesterday [Yesterday's Tractor Co Website, relevant citation dated Feb. 24, 2004] (http://www.yesterdaystractors.com/cgi-bin/viewit.cgi?bd=mf&th=48401).*

* cited by examiner

*Primary Examiner* — Jeremiah Smith
(74) *Attorney, Agent, or Firm* — Knobbe Martens Olson & Bear LLP

(57) ABSTRACT

A battery pack and a manufacturing method thereof are provided. A battery pack includes one or more bare cells. A protection circuit module is provided with a circuit portion and disposed parallel to a length direction of at least one of the bare cells. A connection tab is provided with at least one coupling member so as to electrically connect the protection circuit module to the bare cells. The connection tab is integrally formed with a connection end portion connected to the protection circuit module. Accordingly, a certain amount of coupling member is previously coupled to the connection tab, so that it is possible to improve the problem in a welding process and to implement an automated welding process.

14 Claims, 5 Drawing Sheets

BATTERY PACK AND MANUFACTURING METHOD THEREOF

CROSS-REFERENCE TO RELATED APPLICATIONS

This application claims priority to and the benefit of Korean Patent Application No. 10-2010-0131756, filed on Dec. 21, 2010, in the Korean Intellectual Property Office, the entire content of which is incorporated herein by reference.

BACKGROUND

1. Field

An aspect of the present invention relates to a battery pack used in a portable electronic device and a manufacturing method thereof, and more particularly, to a battery pack and a manufacturing method thereof, in which manufacturing processes are simplified, so that it is possible to reduce the failure rate and the production cost and to implement an automated process.

2. Description of the Related Art

The recent rapid advances in the electronic, communication and computer industries have increased the use of portable electronic devices. Most of such portable electronic devices employ rechargeable secondary batteries as power sources.

Secondary battery packs are widely used at present in portable electronic devices. A typical battery pack has a structure in which a bare cell that supplies electric energy and a protection circuit module (PCM) that controls the charging/discharging of the bare cell are combined into one unit. Conventionally, a method was used in which an electrode tab connected to a bare cell was coupled to a circuit board of a PCM through resistance welding using a welding rod to thereby electrically connect the bare cell and the PCM. However, conventional resistance welding is performed by contacting two welding rods at the fixed position at which the electrode tab is coupled to the circuit board which is often difficult to perform which thereby makes the manufacturing process less efficient.

SUMMARY

Embodiments provide a battery pack and a manufacturing method thereof, in which manufacturing processes are simplified, so that it is possible to reduce failure rate and production cost.

Embodiments also provide a battery pack and a manufacturing method thereof, which can implement an automated process.

According to an aspect of the present invention, there is provided a battery pack including: one or more bare cells; a protection circuit module provided with a circuit portion and disposed parallel to a length direction of at least one of the bare cells; and a connection tab provided with at least one coupling member so as to electrically connect the protection circuit module to the bare cells, the connection tab being integrally formed with a connection end portion connected to the protection circuit module.

The connection end portion may be provided with at least one concave portion formed in a surface thereof.

The section of the concave portion in the length direction may have at least one of a rectangular shape, a trapezoid shape, a hook shape and a circular arc shape.

The coupling member may be provided with a receiving portion complementarily coupled to the concave portion.

The coupling member may include lead.

The connection tab may include at least one selected from the group consisting of nickel, copper, iron and stainless steel.

A portion of the connection tab may be bent so that the bare cells are disposed closely to the protection circuit module.

According to an aspect of the present invention, there is provided a manufacturing method of a battery pack, the method including: preparing one or more bare cells; disposing a protection circuit module provided with a circuit portion to be parallel to a length direction of at least one of the bare cells and; disposing a connection tab provided with at least one coupling member and integrally formed with a connection end portion connected to the protection circuit module so that the protection circuit module is electrically connected to the bare cells; disposing a heating member to correspond to a position of the connection tab; and applying heat to the heating member so that the protection circuit module is electrically connected to the bare cells.

In the disposing of the heating member, the heating member may be a heat compression press provided with at least one heating terminal.

In the disposing of the heating member, the heating member may be at least one wireless soldering iron.

As described above, according to embodiments of the present invention, a certain amount of coupling member is previously coupled to a connection tab, so that it is possible to improve the problem in a welding process and to implement an automated welding process.

Also, through the improvement of the welding process, it is possible to enhance the productivity of the battery pack and to reduce failure rate and production cost.

BRIEF DESCRIPTION OF THE DRAWINGS

The accompanying drawings, together with the specification, illustrate exemplary embodiments of the present invention, and, together with the description, serve to explain at least some of the principles of the present invention.

DETAILED DESCRIPTION

Figure 1:
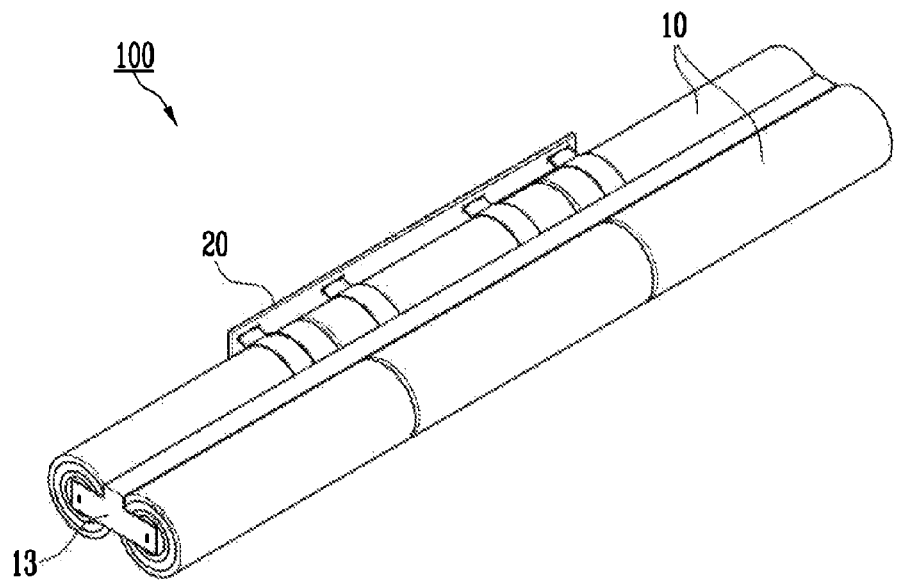
FIG. 1 is a perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and are not necessarily drawn to scale.

Hereinafter, a battery pack according to an embodiment of the present invention will be described with reference to FIGS. 1 to 5.

Figure 2:
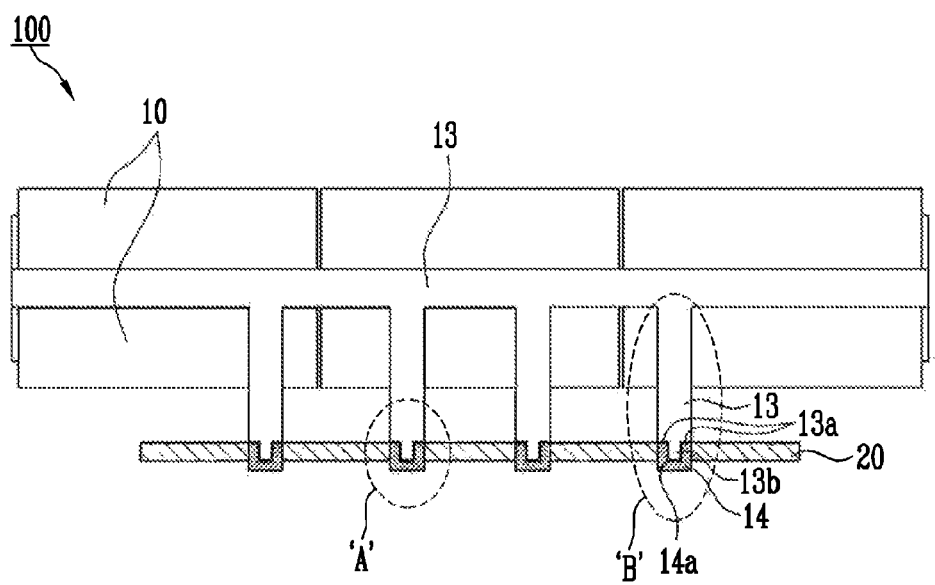
FIG. 2 is a sectional view of the battery pack according to the embodiment of the present invention.
Figure 3A:
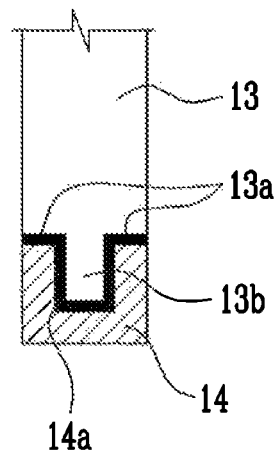
FIGS. 3A, 3B, 3C and 3D are different embodiments of the enlarged view of portion A in FIG. 2.
Figure 3B:
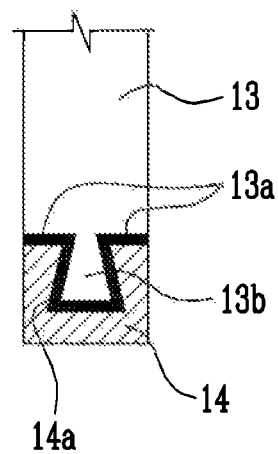
Figure 3C:
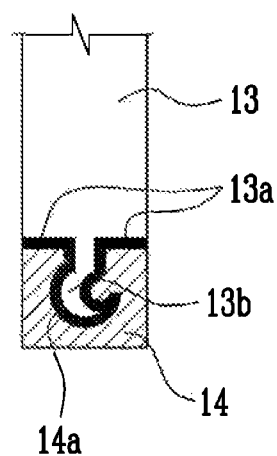
Figure 3D:
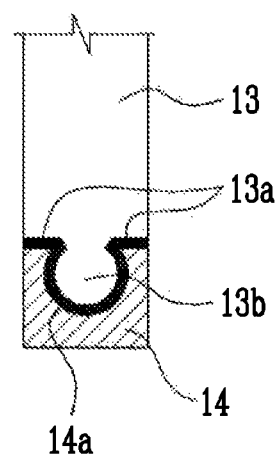
Figure 4:
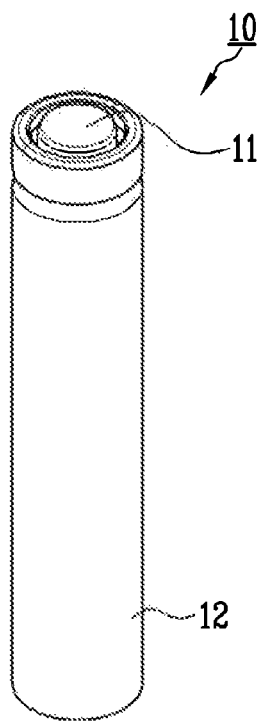
FIG. 4 is an enlarged view of portion B in FIG. 2.
Figure 5:
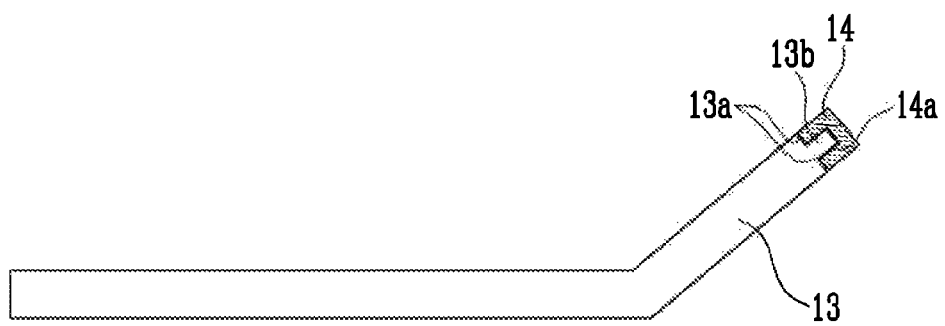
FIG. 5 is a perspective view of a cylindrical bare cell accommodated in the battery pack according to the embodiment of the present invention.

FIG. 1 is a perspective view of a battery pack according to an embodiment of the present invention. FIG. 2 is a sectional view of the battery pack according to the embodiment of the present invention. FIGS. 3A, 3B, 3C and 3D are different embodiments of the enlarged view of portion A in FIG. 2. FIG. 4 is an enlarged view of portion B in FIG. 2. FIG. 5 is a perspective view of a cylindrical bare cell accommodated in the battery pack according to the embodiment of the present invention.

Referring to FIGS. 1 and 2, the battery pack 100 includes cylindrical bare cells 10, a protection circuit module 20 and a connection tab 13 through which the protection circuit module 20 is electrically connected to the bare cells 10. That is, the battery pack 100 includes one or more bare cells 10, a protection circuit module 20 disposed parallel to a length direction of the bare cell 10 and provided with a circuit portion (not shown), and a connection tab 13 provided with a coupling member 14.

Here, the connection tab 13 connects the bare cells 10 connected in parallel, and connects the protection circuit module 20 to the bare cells 10. At least one concave portion 13b is formed in a surface of a connection end portion 13a that is a connection portion between the connection tab 13 and the protection circuit module 20. Here, the connection tab 13 may be formed of at least one selected from the group consisting of nickel, copper, iron and stainless steel. However, the present invention is not limited thereto as long as the connection tab 13 is a metallic or conductive material that can electrically connect the protection circuit module 20 to the bare cells 10.

The protection circuit module 20 is provided at a side of the bare cells 10. The protection circuit module 20 controls voltage or current in charge/discharge of the bare cells 10, so that it is possible to inhibit the bare cells 10 from being overcharged or overdischarged. Therefore, the protection circuit module 20 may include a protection device to control the voltage or current of the bare cells 10 as well as mounting devices such as an external terminal. The external terminal is exposed to an exterior of the battery pack through a cover frame (not shown), and the bare cells 10 are electrically connected to an external device by the external terminal exposed to the exterior. The protection circuit module 20 may further include a conductive pattern for electrical connection between the mounting devices on one or both side surfaces thereof.

Here, the concave portion 13b formed in the surface of the connection end portion 13a may be formed in various shapes. For example, the section of the concave portion 13b in the length direction may be formed in a rectangular shape shown in FIGS. 2 and 3A, a trapezoid shape shown in FIG. 3B, a hook shape shown in FIG. 3C and a curved or circular arc shape shown in FIG. 3D. The concave portions 13b may be provided with a plurality of concave portions, if necessary.

The coupling member 14 is provided with a receiving portion 14a complementarily coupled to the concave portion 13b, which is indicated by bold line in FIGS. 3A to 3D and 4. In one implementation, the concave portion 13a and the receiving portion 14a are integrally coupled to each other. Here, the coupling member 14 may include lead, but the present invention is not limited thereto as long as the coupling member 14 is one melted by heat to be integrally coupled to the concave portion 13b.

Referring to FIG. 4, the bare cell 10 accommodated in the battery pack 100, is formed in a cylindrical shape. The bare cell 10 includes a can 12 with an opening and a cap assembly 11 to close the opening of the can 12. A bottom surface is provided at a position corresponding to the opening of the can 12. Although not shown in this figure, an electrode assembly and an electrolyte are accommodated in the interior of the can 12. The electrode assembly is formed by winding a positive electrode plate, a negative electrode plate and a separator interposed therebetween. Electrode tabs are provided to the positive and negative electrode plates, respectively. The electrode tabs are connected to the can 12 and the cap assembly 11. Therefore, electric energy generated by a chemical reaction between the electrode plates and the electrolyte is transferred to the exterior of the bare cell by the electrode tabs. The one or more bare cells 10 are connected in the battery pack 100 in series, parallel or series-parallel. Six cylindrical bare cells 10 are shown in FIG. 1. The six bare cells 10 are formed in two lines each having three bare cells connected in series to one another, and the two lines are connected in parallel to each other. That is, the bare cells 10 are configured as 3S2P cells, but this is only one embodiment. For example, the number and connection form of the bare cells 10 may be varied.

Referring to FIG. 5, a portion of the connection tab 13 may be bent so that the cylindrical bare cell 10 can be disposed closely to the protection circuit module 20.

Hereinafter, a manufacturing process of a battery pack according to an embodiment of the present invention will be described with reference to FIGS. 6 to 8.

Figure 6:
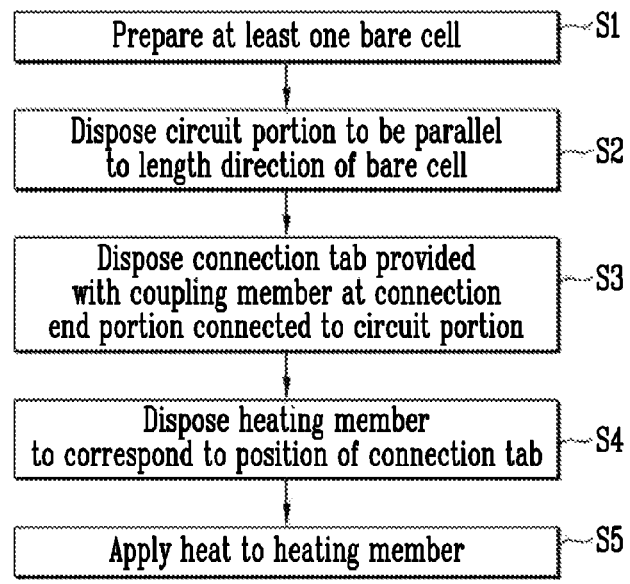
FIG. 6 is a flowchart illustrating a manufacturing process of a battery pack according to an embodiment of the present invention.

FIG. 6 is a flowchart illustrating a manufacturing process of a battery pack according to an embodiment of the present invention. FIG. 7 is a sectional view illustrating a process of applying heat to a coupling member according to an embodiment of the present invention. FIG. 8 is a sectional view illustrating a process of applying heat to the coupling member according to another embodiment of the present invention.

Referring to FIG. 6, the manufacturing process of the battery pack 100 includes preparing at least one bare cell 10 (S1), disposing a protection circuit module 20 parallel to the length direction of the bare cell 10 (S2), disposing a connection tab 13 provided with a coupling member 14 at a connection end portion 13a connected to the protection circuit module 20 (S3), disposing heating members 30 and 40 to correspond to positions of the connection tab 13 (S4), and applying heat to the heating members 30 and 40.

Figure 7:
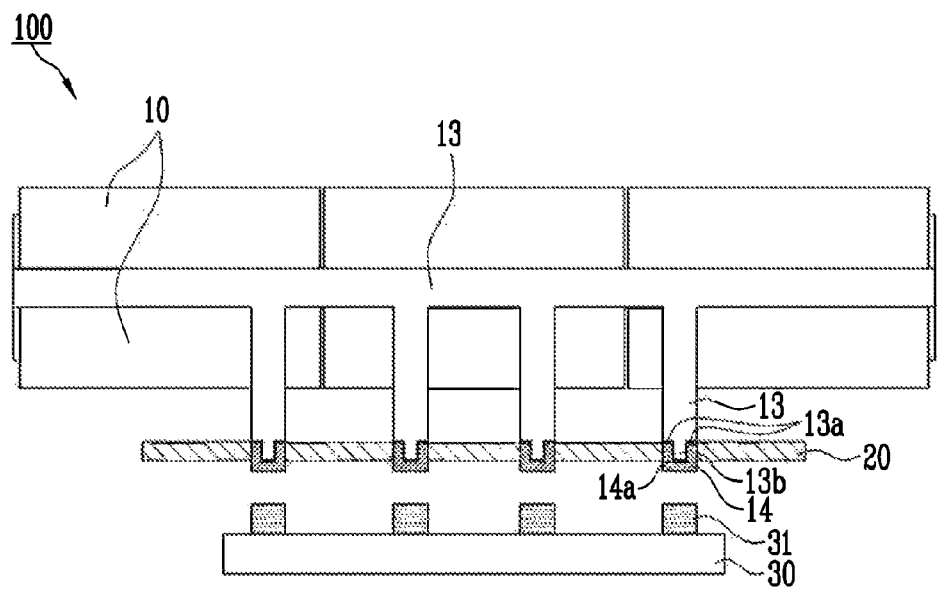
FIG. 7 is a sectional view illustrating a process of applying heat to a coupling member according to an embodiment of the present invention.
Figure 8:
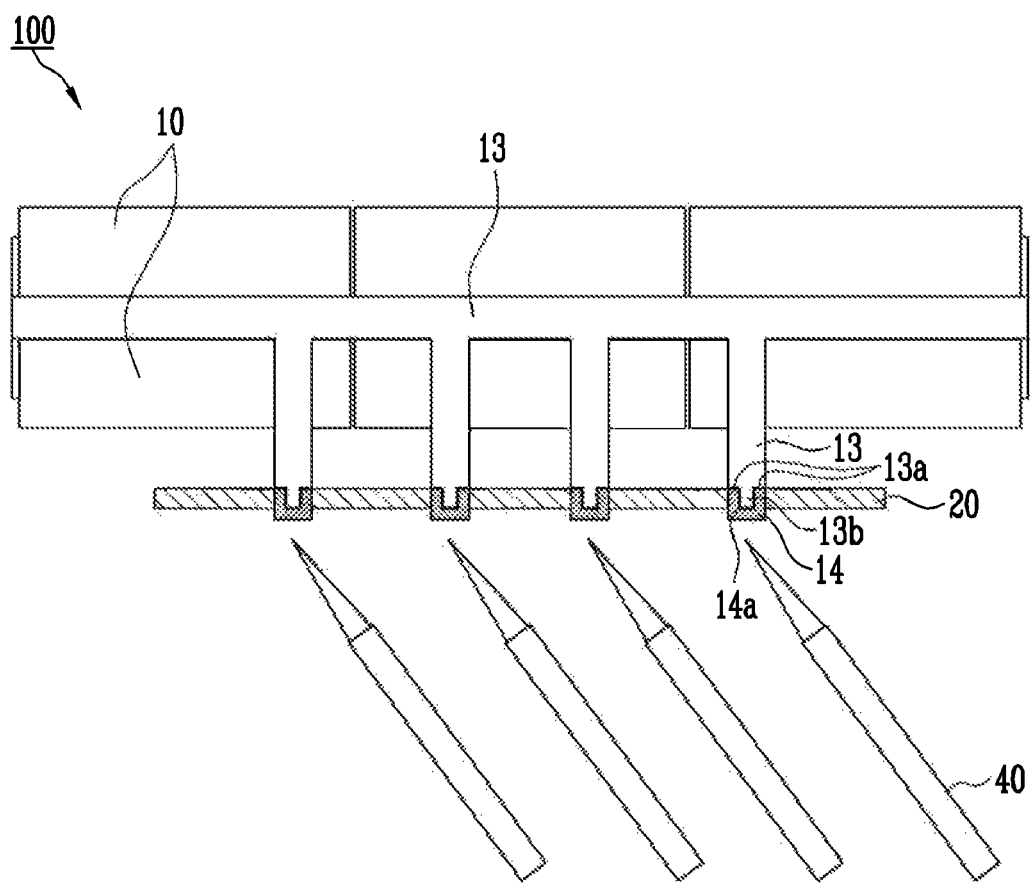
FIG. 8 is a sectional view illustrating a process of applying heat to the coupling member according to another embodiment of the present invention.

In the preparing of the at least one bare cell 10 (S1), six bare cells 10 are formed in two lines each having three bare cells connected in series to one another, and the two lines are connected in parallel to each other, as shown in FIGS. 1, 7 and 8. That is, the bare cells 10 are configured as 3S2P cells, but this is only one embodiment. For example, the number and connection form of the bare cells 10 may be varied.

Subsequently, in the disposing of the protection circuit module 20 parallel to the length direction of the bare cell 10 (S2), a portion of the connection tab 13 may be bent so that the cylindrical bare cell 10 can be disposed closely to the protection circuit module 20.

Subsequently, the disposing of the connection tab 13 provided with the coupling member 14 at the connection end portion 13a connected to the protection circuit module 20 (S3) will be described. At least one concave portion 13b is formed in a surface of the connection end portion 13a that is a connection portion between the connection tab 13 and the protection circuit module 20. Meanwhile, the coupling member 14 is provided with a receiving portion 14a complementarily coupled to the concave portion 13b, and the concave portion 13a and the receiving portion 14a are integrally coupled to each other. Here, the connection tab 13 may be formed of at least one selected from the group consisting of nickel, copper, iron and stainless steel. However, the present invention is not limited thereto as long as the connection tab 13 is a metallic material that can electrically connect the protection circuit module 20 to the bare cells 10. Meanwhile, the coupling member 14 may include lead, but the present invention is not limited thereto as long as the coupling member 14 is one melted by heat to be integrally formed with the concave portion 13b.

Subsequently, the heating members 30 and 40 are disposed to correspond to the positions of the connection tab 13 (S4), and heat is then applied to the heating members 30 and 40 (S5). In a case where the coupling member 14 includes lead, the applying of the heat (S5) may be performed at the temperature range from 350 to 450° C. However, in a case where the coupling member 14 includes another material, it is sufficient that the applying of the heat is performed in the temperature range in which the material is melted so that the coupling member 14 is integrally formed with the concave portion 13b.

Referring to FIG. 7, the heating member 30 may be a heat compression press provided with at least one heating terminal 31. In a case where the heating members 30 using the heat compression press are used, heat is simultaneously applied to the heating members 30 disposed to correspond to the respective positions of the connection tab 13, so that the protection circuit module 20 can be electrically connected to the bare cells 10.

Referring to FIG. 8, the heating members 40 may be at least one wireless soldering iron. If a plurality of wireless soldering irons are disposed to correspond to the respective positions of the connection tab 13, heat is simultaneously applied to the heating members 40 like the case of the heat compression press, so that the protection circuit module 20 can be electrically connected to the bare cells 10.

As described above, in cases where the protection circuit module 20 is electrically connected to the bare cells 10 by using the heating members 30 and 40, both the cases can improve the problem in a welding process to require the existing lead wire and soldering iron. In a case where the lead wire is left for a long period of time during the welding process, there is a problem of excessive soldering. In a case where the lead wire is left for a short period of time, there is a problem of insufficient soldering.

However, if a certain amount of coupling member is previously coupled to the connection tab as described in these embodiments, it is possible to improve the problem in the welding process and to implement an automated welding process. Through the improvement of the welding process, it is possible to enhance the productivity of the battery pack and to reduce failure rate and production cost.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   one or more bare cells;
   a protection circuit module provided with a circuit portion and disposed parallel to
   a length direction of at least one of the bare cells wherein the protection circuit module defines at least one hole extending therethrough; and
   a connection tab formed of a first material provided with at least one coupling member so as to electrically connect the protection circuit module to the bare cells, the at least one coupling member being integrally coupled to a connection end portion of the connection tab to form a coupling joint linking the coupling member to the connection tab and is connected to the protection circuit module wherein the connection tab is formed of a first material and extends into the at least one hole from a first side to a second side and wherein the at least one coupling member is formed of a second material that is heat deformable that couples to the second side of the protection circuit module as a result of heat deformation, the second material being a different material from the first material.

2. The battery pack according to claim 1, wherein the connection end portion is provided with at least one concave portion formed in a surface thereof.

3. The battery pack according to claim 2, wherein the section of the concave portion in the length direction has at least one of a rectangular shape, a trapezoid shape, a hook shape and a circular arc shape.

4. The battery pack according to claim 2, wherein the coupling member is provided with a receiving portion complementarily coupled to the concave portion.

5. The battery pack according to claim 1, wherein the coupling member includes lead.

6. The battery pack according to claim 1, wherein the connection tab includes at least one selected from the group consisting of nickel, copper, iron and stainless steel.

7. The battery pack according to claim 1, wherein a portion of the connection tab is bent so that the bare cells are disposed closely to the protection circuit module.

8. A battery pack comprising:
   at least one bare cell;
   a protection circuit module having a circuit board with a first and a second side and at least one opening extend from the first to the second side;
   a connection tab provided with at least one coupling member that engages with the protection circuit module so as to electrically connect the protection circuit module to the bare cells, the coupling member having a first shape and wherein a connection end portion of the connection tab is formed to have an opening or recess of a shape complementary to the first shape to thereby receive the coupling member and wherein the coupling member and the connection end portion are integrally coupled together wherein the connection tab is formed of a first material and extends into the at least one hole from a first side to a second side and wherein the coupling member is formed of a second material that is heat deformable— that couples to the second side of the protection circuit module as a result of heat deformation, the second material being a different material from the first material.

9. The battery pack of claim 8, wherein the connection end portion includes a meltable conductive material such that the application of heat to the connection end portion results in the connection end portion and coupling members being integrally coupled to each other and to couple the protection circuit module to the connection tab.

10. The battery pack of claim 9, wherein the connection end portion extends from the first side to the second side of the circuit board of the protection circuit module so that heat can be applied to the connection end portion adjacent the second side of the circuit board when the first side of the circuit board is positioned proximate the at least one bare cell.

11. The battery pack of claim 9, wherein the coupling member includes lead.

12. The battery pack of claim 8, wherein the coupling member is concave.

13. The battery pack of claim 12, wherein the coupling member has at least one of a rectangular shape, a trapezoid shape, a hook shape and a circular arc shape.

14. The battery pack of claim 8, wherein a portion of the connection tab is bent so that the at least one bare cell is disposed more closely to the protection circuit module.

* * * * *